United States Patent
Arora et al.

(10) Patent No.: US 12,425,452 B2
(45) Date of Patent: Sep. 23, 2025

(54) DEVICE AUTHENTICATION USING OUT-OF-BAND COMMUNICATIONS

(71) Applicant: Dell Products L.P., Round Rock, TX (US)

(72) Inventors: Mohit Arora, Frisco, TX (US); Abeye Teshome, Austin, TX (US); Richard M. Tonry, Georgetown, TX (US); Bassem El-Azzami, Austin, TX (US); Vinodkumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 18/498,261

(22) Filed: Oct. 31, 2023

(65) Prior Publication Data
US 2025/0141699 A1  May 1, 2025

(51) Int. Cl.
*H04L 9/40* (2022.01)
*H04L 9/32* (2006.01)

(52) U.S. Cl.
CPC ............ *H04L 63/18* (2013.01); *H04L 9/3271* (2013.01); *H04L 63/083* (2013.01); *H04L 63/0876* (2013.01); *H04L 2463/082* (2013.01)

(58) Field of Classification Search
CPC ... H04L 63/18; H04L 63/083; H04L 63/0876; H04L 63/08; H04L 9/3271; H04L 2463/082
See application file for complete search history.

(56) References Cited

U.S. PATENT DOCUMENTS 7,599,907 B2  10/2009  Havewala et al.
8,020,192 B2   9/2011  Wright et al.
(Continued)

OTHER PUBLICATIONS

Venture, Patrick. "In-Band Update of BMC Firmware (and others) using OEM IPMI Blob Transport", Oct. 18, 2018; pp. 1-10; retrieved from http://gerrit.openbmc.org/plugins/gitiles/openbmc/docs/+/838fa962b73deb1ef7908ee8dfa1203fa5263517/designs/firmware_update_via_blobs.me on May 19, 2025 (year:2018) (10 pages).

*Primary Examiner* — Robert B Leung
(74) *Attorney, Agent, or Firm* — WOMBLE BOND DICKINSON (US) LLP

(57) ABSTRACT

Methods and systems for authenticating a user device to an application device are disclosed. The user device may request access to a (computer-implemented) service provided by the application device. Access to the service may include access to sensitive data; therefore, to prevent unauthorized access to the sensitive data, the user device may be authenticated to the application device before the service is provided. To do so, the application device may perform a first factor authentication using in-band hardware resources of the user device; however, the in-band hardware resources may be vulnerable to attacks by malicious parties. Thus, in addition, a second factor authentication of the user device may be performed out-of-band (e.g., using a management controller of the user device) in order to bypass potentially compromised in-band hardware resources. The additional out-of-band authentication may reduce the likelihood of the malicious parties gaining access to the sensitive data via spoofing attacks.

20 Claims, 6 Drawing Sheets

(56) References Cited

U.S. PATENT DOCUMENTS

| | | |
|---|---|---|
| 8,490,163 B1 | 7/2013 | Harsell et al. |
| 8,850,186 B2 | 9/2014 | Yamauchi |
| 9,122,866 B1* | 9/2015 | Kolman ............... G06F 21/46 |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,909,575 B1 | 2/2024 | Mehrotra |
| 2007/0006282 A1 | 1/2007 | Durham |
| 2009/0259848 A1* | 10/2009 | Williams ............... H04L 9/3228 713/168 |
| 2012/0240204 A1* | 9/2012 | Bhatnagar ............... H04L 9/32 726/5 |
| 2014/0380444 A1* | 12/2014 | Kelley ............... H04L 63/18 726/7 |
| 2017/0161501 A1 | 6/2017 | Sood |
| 2017/0277876 A1 | 9/2017 | Alameh et al. |
| 2017/0289197 A1 | 10/2017 | Mandyam et al. |
| 2018/0004954 A1 | 1/2018 | Liguori |
| 2018/0006829 A1 | 1/2018 | Kravitz et al. |
| 2018/0041510 A1* | 2/2018 | Burch ............... H04L 63/18 |
| 2019/0095593 A1 | 3/2019 | Cisneros |
| 2019/0156019 A1 | 5/2019 | Chen |
| 2020/0067922 A1* | 2/2020 | Avetisov ............... H04L 63/0823 |
| 2021/0019392 A1* | 1/2021 | Chaganti ............... H04L 63/0807 |
| 2021/0336772 A1 | 10/2021 | Debata |
| 2022/0222328 A1 | 7/2022 | Talib et al. |
| 2023/0261859 A1 | 8/2023 | Bryden |
| 2023/0403269 A1 | 12/2023 | Valkaitis |
| 2024/0411938 A1 | 12/2024 | Emerson |

* cited by examiner

DEVICE AUTHENTICATION USING OUT-OF-BAND COMMUNICATIONS

FIELD

Embodiments disclosed herein relate generally to security and privacy. More particularly, embodiments disclosed herein relate to systems and methods for authenticating computing devices via a communication system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
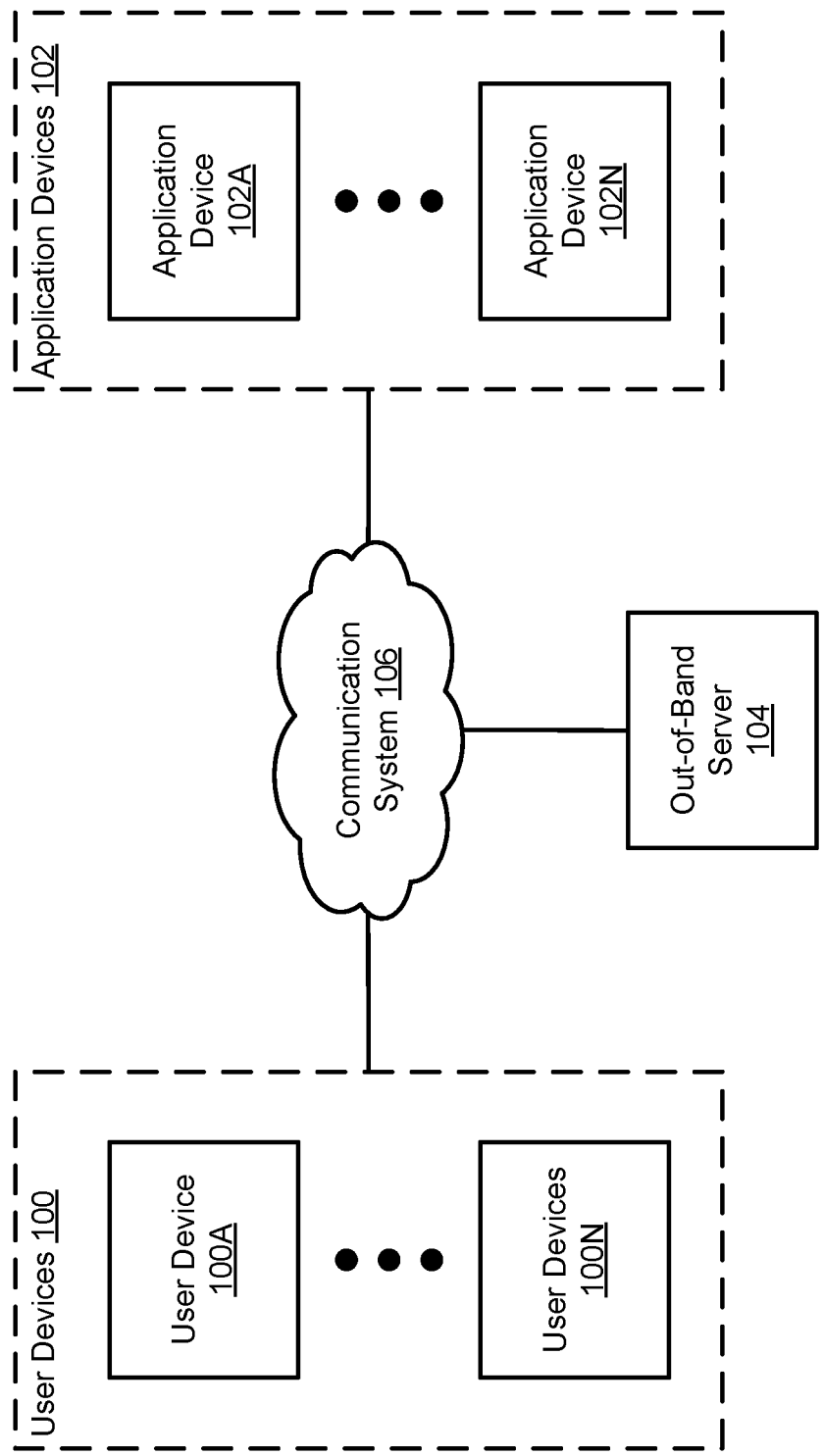
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for device authentication. For example, a user device may host an application through which computer-implemented services (e.g., services) may be provided to a user of the user device. The services may be provided, for example, by an application device (e.g., via the application hosted by the user device). The application device may manage requests for access to functionality of the application from the user device in order to provide the services.

As part of providing the services, the application device may access and/or provide sensitive data (e.g., of the user, such as health information, banking information, etc.) to the user device. The security of the sensitive data may depend on a security framework (e.g., access control measures) implemented around the functionality of the application. For example, to reduce the likelihood of exposing the sensitive data to unauthorized users and/or malicious parties, the application device may perform an authentication process to verify the identity the user and/or the user device before granting access to services requested by the user via the user device.

An authentication process may rely on in-band components (e.g., hardware and/or software components) of the user device when attempting to authenticate the user and/or the user device to the application device. For example, information exchanged with the application device during the authentication process may depend on one or more in-band components of the user device (e.g., a network stack, an operating system, etc.). However, the in-band components of the user device may, for various reasons, become compromised by an unauthorized user (e.g., a malicious party) that may attempt to gain access to the sensitive data. For example, one or more in-band components of the user device are compromised by a malicious party, any attempts to authenticate the user device may be spoofed (e.g., by intercepting and/or modifying the information exchanged during the authentication process), allowing the malicious party access to the sensitive data.

To increase the security of access to the services provided by the application device (thereby increasing the security of sensitive data used by the services), an additional (e.g., second) factor of authentication may be implemented as part of the authentication process. The second factor authentication process may be performed out-of-band (e.g., by an out-of-band cloud server, using out-of-band components of the user device), and may therefore not rely on potentially compromised in-band hardware resources of the user device.

By doing so, embodiments disclosed herein may provide a system for authenticating user devices to application devices using out-of-band authentication. To do so, system may include multiple factors of authentication performed by independent devices using independent communication channels for data exchange with the user device.

For example, a first factor authentication of the user and/or the user device may be performed by an application device providing the service using in-band hardware resources of the user device. The first factor authentication process may include verifying (by the application device) user and/or user device credentials via an in-band communication channel of the user device. A second factor authentication of the user device may be performed, for example, by an out-of-band server that may communicate (e.g., via an out-of-band communication channel) with out-of-band components (e.g., a management controller) of the user device that may operate independently of the in-band components of the user device. By circumventing in-band communication channels and components of the user device, the second factor authentication may be trusted to determine the authenticity of the user device even when the in-band hardware resources of the user device are compromised.

In an embodiment, a computer-implemented method for authenticating a user device to an application device is provided. The method may include: requesting, by in-band hardware resources of the user device, access to a first computer-implemented service provided by the application device; and, providing, by the in-band hardware resources, credentials usable by the application device to ascertain whether to initiate a second factor authentication using an out-of-band server.

In a first instance of the providing where the application device initiates the second factor authentication, the method may include: obtaining, by a management controller of the user device and via an out-of-band communication channel of the user device, a challenge for access to the first computer-implemented service from the out-of-band server; providing, by the management controller and via the out-of-band communication channel, a first response to the challenge to the out-of-band server; obtaining, by the in-band hardware resources, a second response from the application device, the second response indicating whether the user device should be granted the access to the first computer-implemented service; and, providing, by the in-band hardware resources, a second computer-implemented service based on the second response.

An identity of the user device may be provided along with the credentials to facilitate identification of the management controller by the out-of-band server.

In a second instance of the providing where the application device does not initiate the second factor authentication, the method may include obtaining, by the in-band hardware resources, a third response from the application device, the third response indicating that the access to the first computer-implemented service is denied.

Providing the first response may include: invoking, by the management controller, a function of the in-band hardware resources to obtain user input from a user of the user device, the user input indicating whether the user initiated the requesting the access to the first computer-implemented service; and, generating the first response based on the user input.

Providing the first response may also include: identifying, by the management controller, activity of the in-band hardware resources, the activity indicating whether the in-band hardware resources are performing the requesting of the access to the first computer-implemented service; and, generating the first response based on the activity.

The method may also include: making a first determination, by the application device, regarding whether a user of the user device is authentic using the credentials; and, in a first instance of the first determination where the user is authentic, initiating, by the application device, the second factor authentication of the user device using the out-of-band server.

The method may further include, based on the initiating of the second factor authentication: identifying, by the out-of-band server, the management controller of the user device; providing, by the out-of-band server, the challenge to the management controller; obtaining, by the out-of-band server, the first response from the management controller; making, by the out-of-band server, a second determination regarding whether the user device is participating in an authentication to the application device using the first response; and, in a first instance of the second determination where the user device is authentic, notifying, by the out-of-band server, the application device that the user device is authentic.

The user device may include a network module adapted to separately advertise network endpoints for the management controller and the in-band hardware resources, the network endpoints being usable by the out-of-band server to address communications to the management controller.

The out-of-band communication channel may run through the network module, and an in-band communication channel that services the in-band hardware resources may also run through the network module.

The management controller may host a transmission control protocol/internet protocol (TCP/IP) stack to facilitate network communications via the out-of-band communication channel.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, user devices 100, application devices 102, out-of-band server 104, and/or any other type of devices (not shown in FIG. 1A) may perform all, or a portion of the computer-implemented services independently and/or cooperatively. Performing the computer-implemented services may include accessing, obtaining, and/or providing sensitive data; therefore, access to the computer-implemented services may be managed using access control measures such as user and/or user device authentication processes.

User devices 100 may include any number and/or type of user devices (e.g., 100A, 100N). Each user device of the user devices 100 may be operated by a user and/or may facilitate access to and/or provide computer-implemented services. For example, user devices 100 may include functionality for (i) requesting access to a computer-implemented service (e.g., provided by an application device), (ii) providing (e.g., to the application device) credentials usable by an authentication process to, at least partially authenticate the user and/or the user device, (iii) obtaining a response to the request for access (e.g., from the application device or other device), and/or (iv) based on the response, facilitating user access to the requested computer-implemented service and/or other computer-implemented services (e.g., that may be provided by the application device).

Application devices 102 may include any number and/or type of application devices (e.g., 102A, 102N), and/or may host applications that provide computer-implemented services. For example, one or more of application devices 102 may provide computer-implemented services to one or more of user devices 100. To reduce the likelihood of the sensitive data being compromised (e.g., during provision of the computer-implemented services), any of application devices 102 may include functionality for performing and/or participating in an authentication process for any of user devices 100.

For example, application devices 102 may include functionality for (i) obtaining requests from a user device (e.g., of user devices 100) for access to a computer-implemented service, (ii) obtaining credentials from the user device (e.g., credentials for the user device and/or a user of the user device), (iii) verifying the credentials to authenticate a user of the user device and/or the user device itself, (iv) based on the verification, providing the user device access to the requested computer-implemented service, and/or (v) performing other types of actions relating to user and/or user device verification and/or the provision of the requested computer-implemented service.

The authentication process for a user device may rely on the secure operation of the hardware and/or software components (e.g., in-band components) of the user device (e.g., a network stack and/or other management entities of the in-band components of the user device) when attempting to authenticate to an application device. However, these components may be vulnerable to attacks by malicious parties. For example, one or more components of the user device may be exposed, insecurely configured, and/or may otherwise become compromised by a malicious party. If one or more components of the user device are compromised, then the authentication process for the user device may, for example, be spoofed; therefore, the authentication process may not be trusted to authenticate the user device to the application device.

Thus, to increase the security and trustworthiness of the authentication process, second factor authentication may be implemented (in addition to single-factor authentication performed by the application device using in-band components of the user device). A second factor authentication process for the user device may be performed using out-of-band components of the user device and a trusted out-of-band server, in order to circumvent potentially compromised in-band components of the user device.

In general, embodiments disclosed herein may provide methods, systems, and/or devices for authenticating a user device to an application device that may provide computer-implemented services to the user device. The authentication process for the user device to the application device may include two-factor authentication (2FA). For example, the authentication process may include (i) a first (partial) authentication process, which may include verification of user and/or device credentials by the application device, and (ii) a second (partial) authentication process (e.g., second factor authentication), which may include a verification process performed by out-of-band components of the user device.

To perform the authentication process, the system of FIG. 1A may include out-of-band server 104. Other components of the system of FIG. 1A (e.g., user devices 100 and application devices 102) may include additional functionality and/or hardware for facilitating and/or participating in the performance of the authentication process.

As previously discussed, each application device of application devices 102 may include functionality for performing the first (partial) authentication process. In order to facilitate the second (partial) authentication process, each application device of application devices 102 may also include functionality for communicating with an out-of-band server. For example, application devices 102 may (i) initiate performance of the second partial authentication process by the out-of-band server, (ii) obtain results of the second (partial) authentication process from the out-of-band server, and/or (iii) perform other actions relating to the authentication of the user device (e.g., perform additional authentication processes for the user device based on results of any partial authentication processes).

To participate in the second (partial) authentication process, each user device of user devices 100 may include a management controller. The management controller may enable information transfer using a secure out-of-band channel to, for example, a trusted out-of-band server that may participate in the second factor authentication process. Thus, even if in-band components of the user device are compromised, then authentication information (e.g., information generated and/or used by the second authentication process) obtained via out-of-band communications and/or hardware may be trusted. Refer to the discussion of FIG. 1B for additional details regarding the components and functionality of user devices 100.

To perform its functionality, out-of-band server 104 may (i) obtain a request to initiate second factor authentication (e.g., the second partial authentication process) for a user device, (ii) identify out-of-band hardware of the user device (e.g., a management controller of the user device), (iii) generate and/or verify authentication information, (iv) exchange the authentication information with the out-of-band hardware of the user device (e.g., via an out-of-band communication channel, during performance of the second factor authentication), and/or (v) provide the authentication information to other devices participating in the second factor authentication (e.g., the application device). Refer to the discussion of FIG. 2 for additional details regarding processes for authenticating a user device to an application device.

The addition of a second factor authentication performed out-of-band may improve the trustworthiness of the authentication process, and may reduce the likelihood of compromised user devices gaining access to computer-implemented services that may expose sensitive data. As a result, this improvement in the security framework of the authentication process for the user devices may (i) decrease the likelihood of sensitive data being accessed by unauthorized (e.g., malicious) parties, and/or (ii) increase the usability of computer-implemented services provided via the user devices (e.g., by virtue of users of the user devices having increased trust in the authentication process).

Figure 3A:
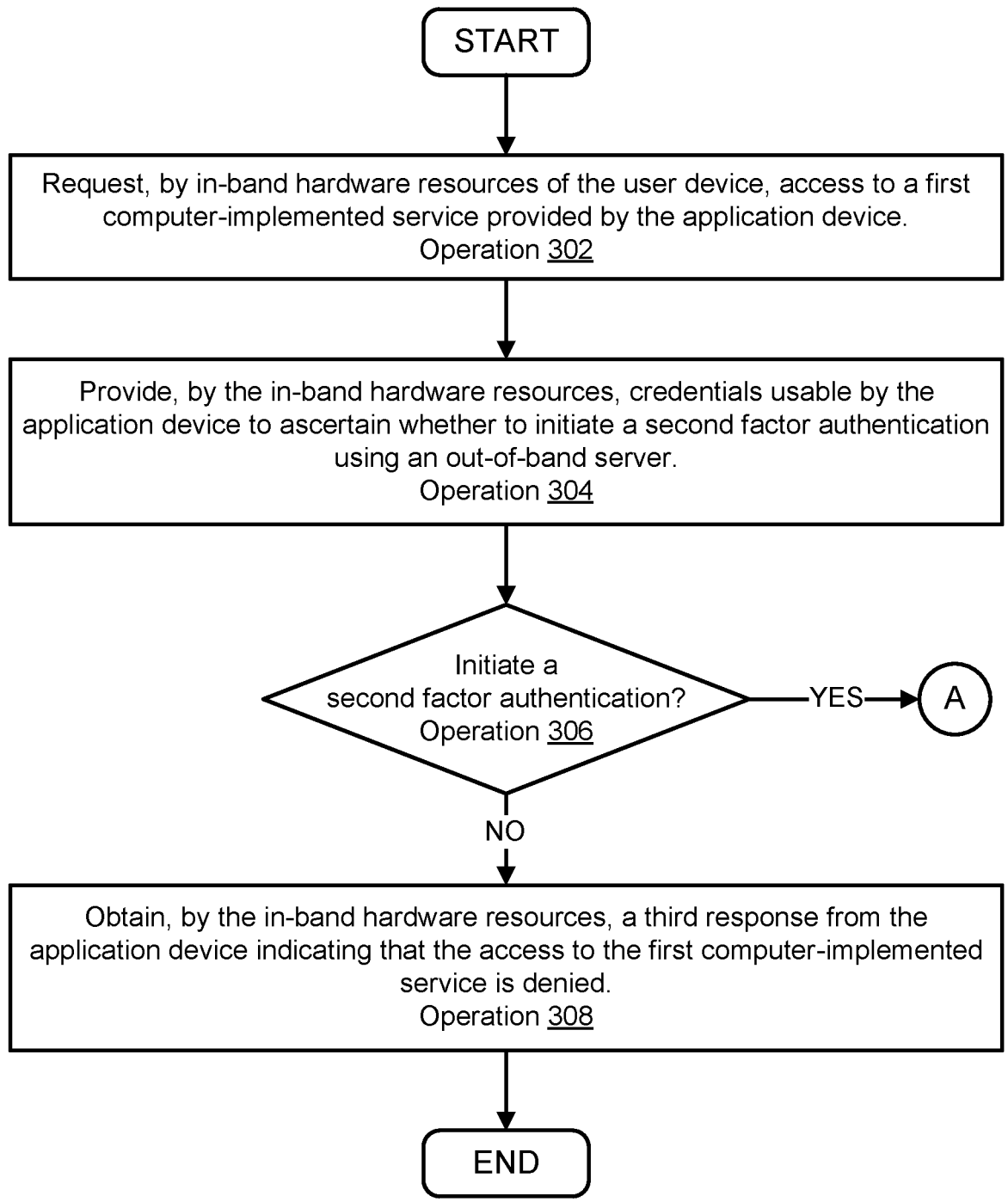
FIGS. 3A-3B show flow diagrams illustrating a method for authenticating a user device to an application device using an out-of-band server in accordance with an embodiment.
Figure 3B:
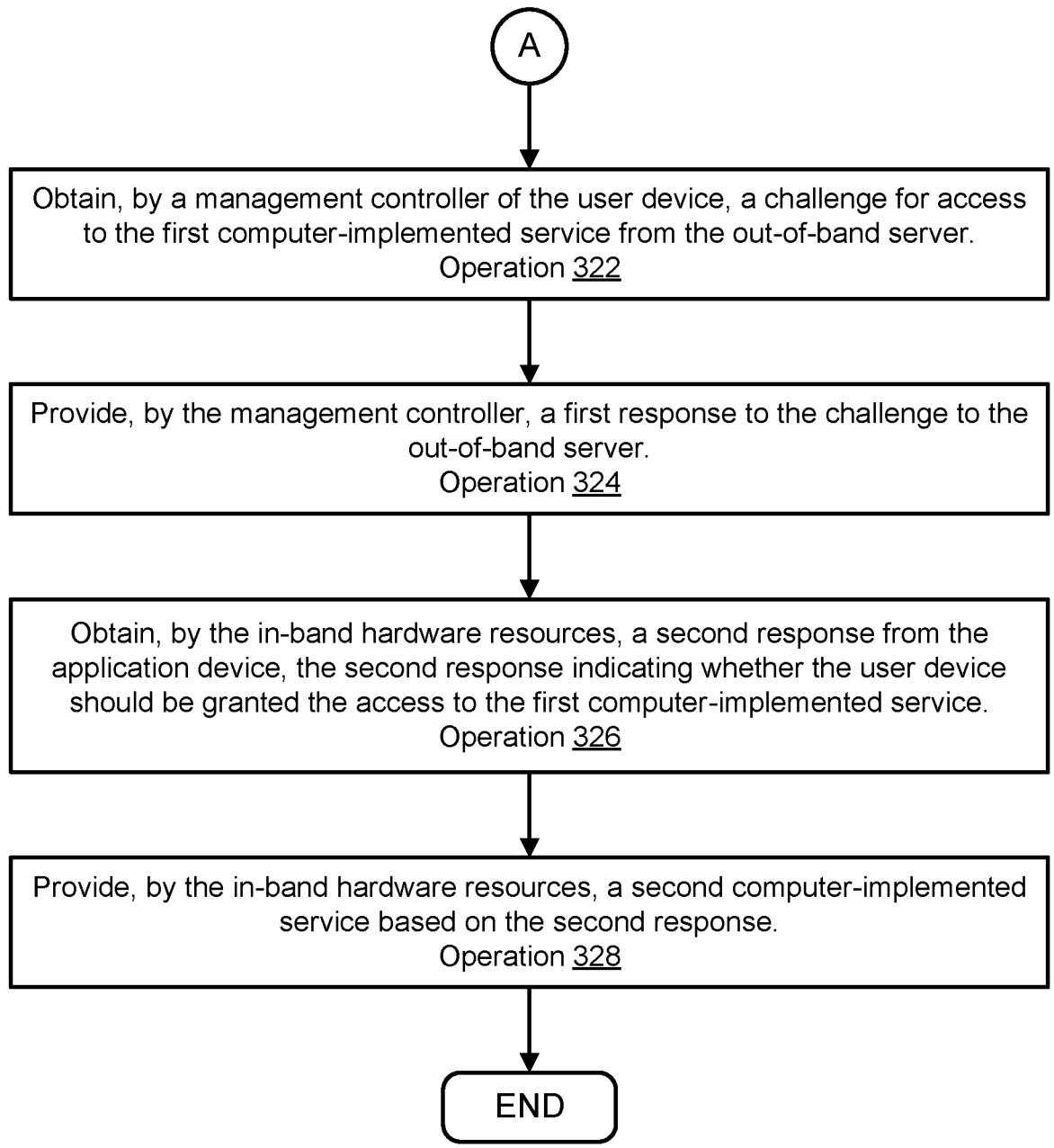

When providing their functionality, any of user devices 100, application devices 102, and/or out-of-band server 104 may perform all, or a portion of the methods shown in FIGS. 3A-3B.

Any of (and/or components thereof) user devices 100, application devices 102, and/or out-of-band server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of user devices 100, application devices 102, and/or out-of-band server 104 are implemented using an internet of things (IoT) device, which may include a computing device. The IoT device may operate in accordance with a communication model and/or management model known to user devices 100, application devices 102, out-of-band server 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single out-of-band server (e.g., 104), it will be appreciated that the system may include any number of out-of-band servers.

Figure 1B:
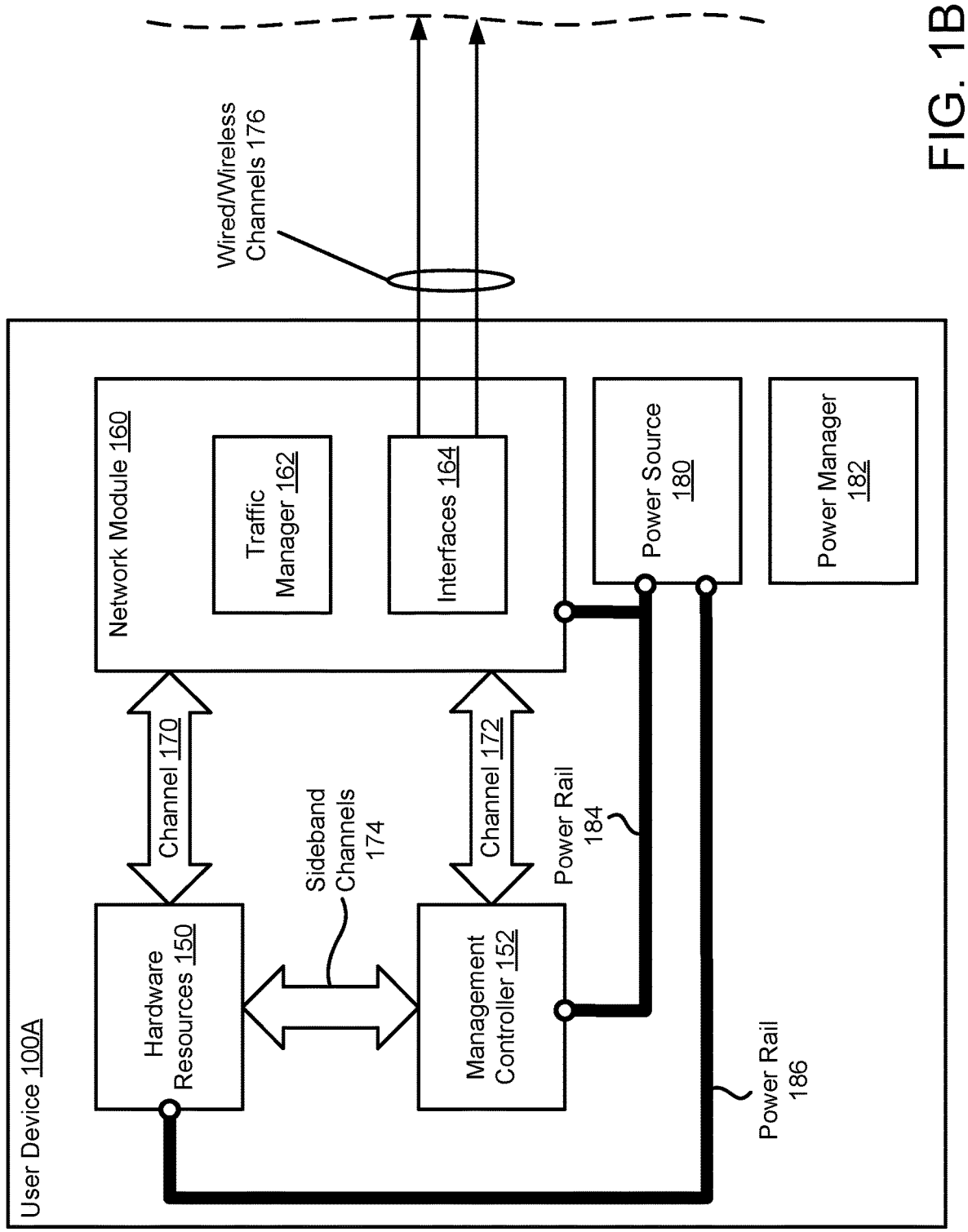
FIG. 1B shows a block diagram illustrating a user device in accordance with an embodiment.

Turning to FIG. 1B, a diagram illustrating a user device in accordance with an embodiment is shown. User device 100A may be a data processing system similar to any of the computing devices (e.g., user devices 100) shown in FIG. 1A.

To provide computer-implemented services, user device 100A may include any quantity of hardware resources 150. Hardware resources 150 may be in-band hardware components (e.g., in-band hardware resources), and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of user device 100A) to another device via any number of intermediate networks (e.g., via wired/wireless channels 176 that are part of the networks).

To reduce the likelihood of the applications and/or other in-band entities from being indirectly compromised, user device 100A may include management controller 152 and network module 160. Each of these components of user device 100A is discussed below.

Management controller 152 may be implemented, for example, using a system on a chip or other type of independently operating computing device (e.g., independent from the in-band components, such as hardware resources 150 of a host user device 100A). Management controller 152 may provide various management functionalities for user device 100A. For example, management controller 152 may monitor various ongoing processes performed by the in-band components, may manage power distribution, thermal management, and/or may perform other functions for managing user device 100A.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

For example, when participating in an authentication process for user device 100A to an application hosted by user device 100A, management controller 152 may interact with (e.g., send authentication data to) the application directly, bypassing any in-band components (e.g., network communication components) of user device 100A. By doing so, authentication data transmitted between management controller 152 and the application may not be exposed to potentially compromised in-band components of user device 100A that may intercept and/or modify the authentication data.

Management controller 152 may be operably connected to communication components of user device 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, user device 100A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by user device 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, an out-of-band server (e.g., 104) attempting to authenticate user device 100A to an application may communicate with the application hosted by user device 100A as part of an authentication process. To do so, the out-of-band server may address a message to a network endpoint advertised by network module 160 for out-of-band communications. Once the message is received by the network endpoint, traffic manager 162 may then forward the message to management controller 152 via an out-of-band communication channel (e.g., channel 172), differentiating the message from in-band communications to user device 100A that may be addressed to a different (e.g., separate) network endpoint.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of user device 100A may appear to be two independent network entities, that may be independently addressable and/or otherwise unrelated to one another.

To facilitate management of user device 100A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, user device 100A may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2:
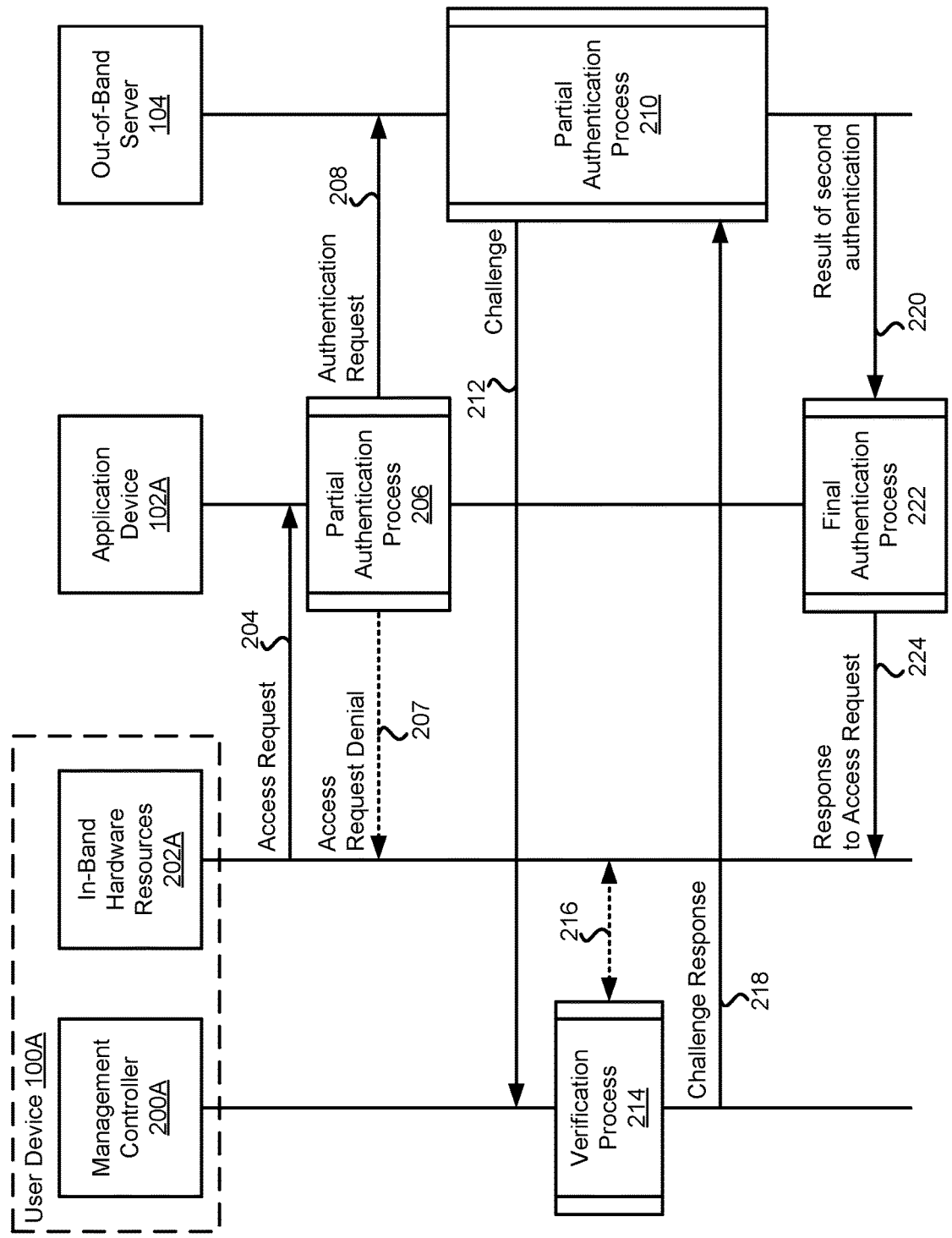
FIG. 2 shows an interaction diagram illustrating an authentication process in accordance with an embodiment.

To further clarify embodiments disclosed herein, an interaction diagram in accordance with an embodiment is shown in FIG. 2. The interaction diagram may illustrate how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 200A, 202A, etc.), located towards the top of each figure. Lines descend from these shapes. Processes performed by the components of the system are illustrated using a second set of shapes (e.g., 206, 210 etc.) superimposed over these lines. Interactions (e.g., communication, data transmissions, etc.) between the components of the system are illustrated using a third set of shapes (e.g., 204, 208, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines terminating in one or two arrows that are drawn in dashing (e.g., 207, 216) may indicate, for example, that the corresponding interaction(s) (i) may be optional, and/or (ii) may occur depending on the outcome of the processes and/or other interactions occurring in the diagram (or for other reasons).

Generally, the processes and interactions are temporally ordered in an example order, with time increasing from the top to the bottom of each page. For example, the interaction labeled as 204 may occur prior to the interaction labeled as 208. However, it will be appreciated that the processes and interactions may be performed in different orders, any may be omitted, and other processes or interactions may be performed without departing from embodiments disclosed herein.

The processes shown in FIG. 2 may be performed by any entity shown in the systems of FIGS. 1A-1B (e.g., a device similar to one of user devices 100, a server similar to out-of-band server 104, etc.) and/or another entity without departing from embodiments disclosed herein.

Turning to FIG. 2, an interaction diagram in accordance with an embodiment is shown. The interaction diagram may illustrate processes and interactions that may occur during an authentication process for a user device to an application device. For example, application device 102A may provide a computer-implemented service via an application hosted by user device 100A.

To access the computer-implemented service, a user of user device 100A may initiate a request for functionality of the application (e.g., a request for access to the computer-implemented service). As discussed with respect to FIG. 1B, user device 100A may include in-band hardware resources 202A. For example, the user may initiate an access request using in-band hardware resources 202A.

The access request may include, for example, (i) identifying information of user device 100A, (ii) identifying information of the user (e.g., credentials usable to authenticate the user), (iii) information regarding the application and/or the requested computer-implemented service, and/or (iv) other information usable to establish a secure communication channel with another device for data exchange (e.g., certificates, encryption information, etc.).

At interaction 204, the access request initiated by the user may be provided to application device 102A from in-band hardware resources 202A (e.g., via an in-band communication channel of user device 100A). For example, the access request may be generated and provided to application device 102A via (i) transmission via a message, (ii) storing in a storage with subsequent retrieval by application device 102A, (iii) via a publish-subscribe system where application device 102A subscribes to updates from an access request management system (not shown), thereby causing a copy of the access request to be propagated to application device 102A, and/or (iv) via other processes. By providing the access request to application device 102A, application device 102A may be prompted to authenticate the user and/or user device 100A.

To authenticate the user and/or user device 100A, application device 102A may perform partial authentication process 206. During partial authentication process 206, the identity of the user may be authenticated using one or more methods of authentication. For example, the credentials (e.g., that were provided along with the access request), which may include a username and password combination, may be verified (e.g., during a verification process included as part of partial authentication process 206, not shown). If the credentials are valid (e.g., the username and password are a valid combination), then the user may be considered authentic. Otherwise, if the credentials are not valid (e.g., the username and password are not a valid combination), then the user may be considered inauthentic and may not be authenticated by application device 102A.

Other types of verification (e.g., device verification) may be included as part of partial authentication process 206. For example, prior to the access request being initiated by the user of user device 100A, user device 100A may be registered (e.g., as a trusted device for facilitating functionality of the application) with application device 102A during a registration process (not shown). The registration process may include registering one or more users (e.g., the user) of user device 100A. Thus, partial authentication process 206 may include verifying, for example, that a user and a user device combination (e.g., the user and user device 100A) are registered to access functionality of the application.

During partial authentication process 206, application device 102 may ascertain (e.g., based on the credentials) whether to initiate a second factor authentication using an out-of-band server (e.g., 104). For example, if partial authentication process 206 determines that the user is authentic (and that the user and user device combination are registered to access functionality of the application), then partial authentication process 206 may include initiating a second factor authentication of user device 100A (e.g., generating an authentication request). Otherwise, for example, if it is determined that the user is inauthentic and/or that the user and user device combination are not registered to access functionality of the application, then partial authentication process 206 may include generating a response (e.g., an access request denial) indicating that the access to the first computer-implemented services is denied.

At interaction 207, if an access request denial is initiated (e.g., generated) during partial authentication process 206, then the access request denial may be provided by application device 102A to in-band hardware resources 202A of user device 100A (e.g., via a network endpoint advertised by user device 100A for in-band communication). For example, the access request denial may be provided to user device 100A via (i) transmission via a message, (ii) storing in a storage with subsequent retrieval by user device 100A, (iii) via a publish-subscribe system where user device 100A subscribes to updates from an access request management system (not shown), thereby causing a copy of the access request denial to be propagated to user device 100A, and/or (iv) via other processes. Upon obtaining the access request denial, user device 100A may notify the user that the request for access has been denied.

At interaction 208, if an authentication request is obtained (e.g., generated) during partial authentication process 206, then the authentication request may be to out-of-band server 104 by application device 102A. For example, the authentication request may be provided to out-of-band server 104 via (i) transmission via a message, (ii) storing in a storage with subsequent retrieval by out-of-band server 104, and/or (iii) via other processes. The authentication request provided to out-of-band server 104 may include information provided as part of and/or along with the access request (e.g., the identifying information of user device 100A). By providing the authentication request to out-of-band server 104, out-of-band server 104 may perform an out-of-band authentication service that may attempt to authenticate user device 100A.

To authenticate user device 100A, out-of-band server 104 may perform partial authentication process 210 (e.g., the second factor authentication). During partial authentication process 210, out-of-band server 104 may identify out-of-band hardware resources of user device 100A using the identifying information of user device 100A. For example, out-of-band server 104 may associate a device identifier of user device 100A with its management controller (e.g., 200A) and information required to establish an out-of-band communication channel with management controller 200A (e.g., a network address for out-of-band communications associated with the device identifier of user device 100A).

Partial authentication process 210 may include a challenge-response protocol for authenticating user device 100A. For example, partial authentication process 210 may include obtaining (e.g., generating) a challenge, to which user device 100A may provide a valid response in order to be authenticated. The challenge may include, for example, (i) a string of characters (e.g., a challenge code, which may include a challenge code identifier), (ii) information from the access request (e.g., information regarding the application and/or the requested computer-implemented service), and/or (iii) other information usable for the challenge-response authentication.

At interaction 212, the challenge may be provided to management controller 200A of user device 100A (e.g., via an out-of-band communication channel of user device 100A). As discussed with respect to FIG. 1B, user device 100A may include a network module adapted to separately advertise network endpoints for management controller 200A and in-band hardware resources of user device 100A. Thus, out-of-band server 104 may address communications to management controller 200A via a network endpoint advertised for communications with management controller 200A, without traversing any in-band communication channels.

The challenge may be provided to management controller 200A, for example, via (i) transmission via a message, (ii) storing in a storage with subsequent retrieval by management controller 200A, and/or (iii) via other processes. By providing the challenge to management controller 200A, management controller 200A may perform a verification process in order to provide a response to the challenge (e.g., a challenge response).

To provide a challenge response, verification process 214 may be performed. Verification process 214 may include (i) obtaining user input from the user, (ii) identifying activity of in-band hardware resources 202A, (iii) generating the challenge response based on the user input and/or the activity, and/or (iv) providing the challenge response to out-of-band server 104 (e.g., using out-of-band communication channels of user device 100A). For example, management controller 200A may obtain the user input and/or the activity via sideband channels (e.g., 174) at interaction 216.

During verification process 214, management controller 200A may invoke a function of in-band hardware resources 202A to obtain user input from the user. For example, the function of in-band hardware resources 202A may include a pop-up graphical user interface (GUI) notification that may prompt the user to input a one-time passcode. The user input may indicate whether (i) the user is the authenticated user (e.g., authenticated during partial authentication process 206), and/or (ii) the user initiated the request for functionality of the application (e.g., requesting access to the computer-implemented service) while operating user device 100A. In other words, the user input may indicate whether user device 100A is participating in an authentication process with application device 102A (e.g., for the purpose of gaining access to the computer-implemented service).

For example, the user may provide (e.g., input) a correct one-time passcode indicating (to management controller 200A) that the user requested access to the computer-implemented service from user device 100A. Otherwise, the user may provide an incorrect one-time passcode, may not provide any user input, or otherwise indicate to management controller 200A that the user did not request the access to the computer-implemented service and/or that the user did not request the access to the computer-implemented service via user device 100A.

During verification process 214, management controller 200A may identify activity of in-band hardware resources 202A. For example, as discussed with respect to FIG. 1B, management controller 200A may monitor activity of (e.g., ongoing processes performed by) in-band hardware resources 202A. The activity may indicate whether in-band hardware resources 202A are performing the requesting of the functionality of the application (e.g., requesting access to the computer-implemented service). For example, the activity of in-band hardware resources 202A may indicate that user device 100A is participating in an authentication process with application device 102A (e.g., for the purpose of gaining access to the computer-implemented service).

Management controller 200A may, as part of verification process 214, generate the challenge response based on indications that user device 100A is authentically requesting the functionality of the application (e.g., based on the user input, the activity of in-band hardware resources 202A, and/or a combination thereof). For example, the challenge response may be generated without relying on the user input.

The challenge response may include, for example, (i) a string of characters that may indicate whether user device 100A is authentically requesting the functionality of the application, (ii) information from verification process 214 (e.g., the user input, the activity, and/or interpretations thereof), and/or (iii) other information usable for the challenge-response authentication. For example, if information obtained and/or interpreted by management controller 200A during verification process 214 indicates user device 100A is authentically requesting the functionality, then the string of characters may include a correct password, and/or if the challenge is an encrypted value, then the response may be a pre-determined similarly encrypted value. Otherwise, the string of characters may include an incorrect password, and/or may otherwise indicate (to out-of-band server 104) that user device 100A may be inauthentically requesting the functionality.

At interaction 218, the challenge response may be provided to out-of-band server 104 by management controller 200A (e.g., via an out-of-band communication channel of user device 100A). For example, the challenge response may be provided to out-of-band server 104 via (i) transmission via a message, (ii) storing in a storage with subsequent retrieval by out-of-band server 104, and/or (iii) via other processes. By providing the challenge to out-of-band server 104, out-of-band server 104 may continue and/or complete performance of the second factor authentication.

To continue partial authentication process 210, out-of-band server 104 may obtain the challenge response from user device 100A (e.g., from management controller 200A). The challenge response may be used to determine the authenticity of user device 100A (e.g., whether user device 100A is participating in an authentication to application device 102A). For example, partial authentication process 210 may obtain a result of the second authentication based on a verification of the challenge response. The result of the second authentication may be used to notify application device 102A of the authenticity of user device 100A.

At interaction 220, the result of the second authentication may be provided to application device 102A by out-of-band server 104. For example, the result of the second authentication may be provided to application device 102A via (i) transmission via a message, (ii) storing in a storage with subsequent retrieval by application device 102A, and/or (iii) via other processes. By providing the result of the second authentication to application device 102A, application device 102A may finalize the authentication process (e.g., perform final authentication process 222).

To perform final authentication process 222, application device 102A may obtain a notification (e.g., the result of the second authentication) indicating whether user device 100A is authentic. During final authentication process 222, application device 102A may grant or deny user device 100A functionality of the application (e.g., grant or deny access to access to the computer-implemented service). To do so, final authentication process 222 may include generating and/or providing a response to the access request (e.g., obtained by application device 102A at interaction 204). The response to the access request may, for example, indicate whether user device 100A has been granted the access to the computer-implemented service.

At interaction 224, the response to the access request may be provided to user device 100A by application device 102A (e.g., via an in-band communication channel of user device 100A). For example, the response to the access request may be provided to user device 100A via (i) transmission via a message, (ii) storing in a storage with subsequent retrieval by application device 102A, and/or (iii) via other processes. By providing the response to the access request to user device 100A, user device 100A may be prompted to provide a second computer-implemented service.

To provide the second computer-implemented service, user device 100A (e.g., in-band hardware resources 202A) may obtain the response to the access request (e.g., via an in-band communication channel of user device 100A). Based on the response to the access request, the second computer-implemented service may include, for example, (i) facilitating the requested computer-implemented service, (ii) notifying the user that access to the requested computer-implemented service has been denied (e.g., via a display GUI), and/or (iii) performing other actions (e.g., for additional authentication options, notifying an entity that access to the requested computer-implemented service was allowed and/or denied, etc.)

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to authenticate a user device to an application device. FIGS. 3A-3B illustrate methods that may be performed by the components of the system of FIGS. 1A-2. In the diagrams discussed below and shown in FIGS. 3A-3B, any of the operations may be repeated, performed in different orders, and/or performed in parallel with or in a partially overlapping in time manner with other operations. The methods described with respect to FIGS. 3A-3B may be performed by a data processing system, and/or another device.

In FIGS. 3A-3B, flow diagrams illustrating a method for authenticating a user device (to an application device) using an out-of-band server are shown in accordance with an embodiment. The method may be performed by the system of FIGS. 1A-1B.

Turning to FIG. 3A, at operation 302, in-band hardware resources of the user device may request access to a first computer-implemented service provided by the application device. The access may be requested by (i) initiating an access request (e.g., by a user of the user device), (ii) generating the access request (e.g., by the in-band hardware resources of the user device), and/or (iii) transmitting the access request to the application device (e.g., via a secure in-band communication channel). For example, the user may initiate operation of an application (hosted by the user device) that may facilitate the provision of the first computer-implemented service to the user. Upon initiation, the application may automatically generate the access request and/or provide the access request to the application device.

At operation 304, the in-band hardware resources may provide credentials usable by the application device to ascertain whether to initiate a second factor authentication using an out-of-band server. The credentials may be provided by (i) prompting (by the in-band hardware hosting the application) the user to input the credentials (e.g., via a GUI), (ii) reading the credentials input by the user, (iii) transmitting the credentials to the application device along with the access request (e.g., as part of an access request bundle), and/or (iv) any other methods. An identity of the user device may be included along with the credentials (e.g., included as part of the access request bundle) and/or may be provided along with the credentials. The access request bundle may include information usable in the authentication process for the user device to the application device.

At operation 306, the application device may ascertain whether the second factor authentication using the out-of-band server may be initiated. The application device may ascertain whether to initiate the second factor authentication by making a determination whether the user of the user device is authentic using the credentials. The determination may be made by (i) receiving information regarding the authenticity of the user (e.g., from another device), and/or (ii) verifying the credentials. The credentials may be verified (e.g., validated or invalidated), for example, as part of a first factor authentication process (as described with respect to FIG. 2), and/or by any other method. For example, if the credentials are valid, then the user may be considered authentic; whereas, if the credentials are invalid, then the user may not be considered authentic.

If the credentials are valid (e.g., the user is authentic), then the application device may initiate the second factor authentication and the method may proceed to operation 322 (refer to FIG. 3B) following operation 306. Otherwise, if the credentials are invalid (e.g., the user is inauthentic), then the application device may not initiate the second factor authentication and the method may proceed to operation 308 following operation 306.

At operation 308, in an instance of the providing (of the credentials) where the application device does not initiate the second factor authentication, the in-band hardware resources may obtain a third response from the application device indicating that the access to the first computer-implemented service is denied. The third response from the application device may be obtained (e.g., via the established secure in-band communication channel) by (i) receiving the third response from the application device and/or another entity via communication by a data processing system, (ii) reading the third response from storage, and/or (iii) any other methods.

The method may end following operation 308.

Returning to operation 306, the method may proceed to operation 322 following operation 306 when the application device initiates the second factor authentication.

Turning to FIG. 3B, at operation 322, in another instance of the providing (of the credentials) where the application device initiates the second factor authentication, a management controller of the user device may obtain a challenge for access to the first computer-implemented service from the out-of-band server. The challenge may be obtained (e.g., via a secure out-of-band communication channel of the user device) by (i) receiving the challenge from the out-of-band server and/or another entity via communication by a data processing system, (ii) reading the challenge from storage, and/or (iii) any other methods.

Prior to the management controller obtaining the challenge and after the application device initiates the second factor authentication by the out-of-band server, the out-of-band server may identify the management controller of the user device. The management controller may be identified by (i) obtaining information from the application device regarding the initiation of the second factor authentication (e.g., an identity of the user device), (ii) associating the identity of the user device with the management controller of the user device (e.g., via a database lookup), and/or (iii) obtaining information regarding the management controller (e.g., network address information and/or other information usable to establish a secure connection with the management controller). The out-of-band server may use information regarding the user device and/or the management controller to generate the challenge and/or provide the challenge to the management controller (e.g., via an established secure out-of-band communication channel).

At operation 324, the management controller may provide a first response to the challenge to the out-of-band server. The first response may be provided by (i) performing a verification process to obtain the first response, and/or (ii) transmitting the first response (e.g., via the out-of-band communication channel) to the out-of-band server. For example, as described with respect to FIG. 2, the verification process may be performed by (i) invoking a function of the in-band hardware resources to prompting the user for user input (e.g., to confirm the authenticity of the user device), and/or (ii) monitoring and/or identifying activity of the in-band hardware resources.

For example, the verification process (e.g., obtaining of user input and/or identification of in-band hardware activity) may be performed by generating and/or executing computer instructions (by the management controller, independently of an in-band processor of the user device) to collect data from the user and/or in-band hardware resources using sideband channels of the user device. The management controller may generate the first response based on the user input and/or the identified activity (e.g., and whether the user input and/or identified activity indicate that the user device is participating in an authentication process).

The out-of-band server may obtain the first response from the management controller via the established out-of-band communication channel. Using the first response, the out-of-band server may make a determination regarding whether the user device is participating in an authentication to the application device by verifying the first response. For example, verifying the first response may include (i) validating a password (e.g., in response to a challenge asking for a password), and/or (ii) decrypting a message (e.g., the message indicating whether user input and/or in-band hardware activity indicates that the user device is participating in the authentication).

The out-of-band server may determine that the user device is authentic (e.g., that the user device is participating in the authentication) or that the user device is inauthentic (e.g., that the user device is not participating in the authentication). The out-of-band server may notify the application device that the user device is authentic (or inauthentic) by transmitting a message (e.g., result of the second authentication) to the application device.

The application device may obtain the message (e.g., the result of the second authentication), and may perform a final authentication process. The final authentication may be performed by reading the message obtained from the out-of-band server. For example, if the result of the second authentication is that the user device is authentic, then the application device may grant the user device access to the first computer-implemented service. Otherwise, if the result of the second authentication is that the user device is inauthentic, the application device may deny the user device access to the first computer-implemented service. Based on the result of the second authentication, the application device may transmit a second response to the user device via the established secure in-band communication channel.

At operation 326, the in-band hardware resources may obtain a second response from the application device. The second response may be obtained by (i) receiving the second response from the application device and/or another entity via communication by a data processing system (e.g., via a secure in-band communication channel of the user device), (ii) reading the second response from storage, and/or (iii) any other methods. The second response may indicate whether the user device should be granted the access to the first computer-implemented service.

At operation 328, the in-band hardware resources may provide a second computer-implemented service based on the second response. If the second response indicates that the user device has access to the first computer-implemented service, then the second computer-implemented services may be provided by facilitating the first computer-implemented service. If the second response indicates that the user device is denied access to the first computer-implemented service, then the second computer-implemented services may be provided by notifying the user of the user device (e.g., using a display GUI) that access to the first computer-implemented service has been denied. Providing the second computer-implemented services may include initiating and/or performing more actions for authentication of the user device, notifying an entity that attempted access to the first computer-implemented service has been denied, etc.

The method may end following operation 328.

Thus, as illustrated above, embodiments disclosed herein may provide systems and methods usable to authenticate user devices to application devices that may provide sensitive computer-implemented services (e.g., computer-implemented services that may access and/or provide sensitive data). To increase the security of access to the sensitive computer-implemented services, the authentication process may include multi-factor authentication, for which the first factor may be performed using in-band components and communications, and the second factor may be performed using out-of-band components and communications. The resulting improved authentication process is more likely to (i) improve the security of sensitive data (e.g., by reducing the likelihood of access to the sensitive data by unauthorized users), and/or (ii) reduce disruptions in the computer-implemented service provided via the sensitive data (e.g., by decreasing the likelihood of security breaches of the sensitive data by authorized users).

Thus, embodiments disclosed herein may provide an improved computing device that is able to reduce the likelihood of providing sensitive computer-implemented services to unauthorized users. Accordingly, the disclosed process provides for both an embodiment in computing technology and an improved method for securing access to sensitive data.

Figure 4:
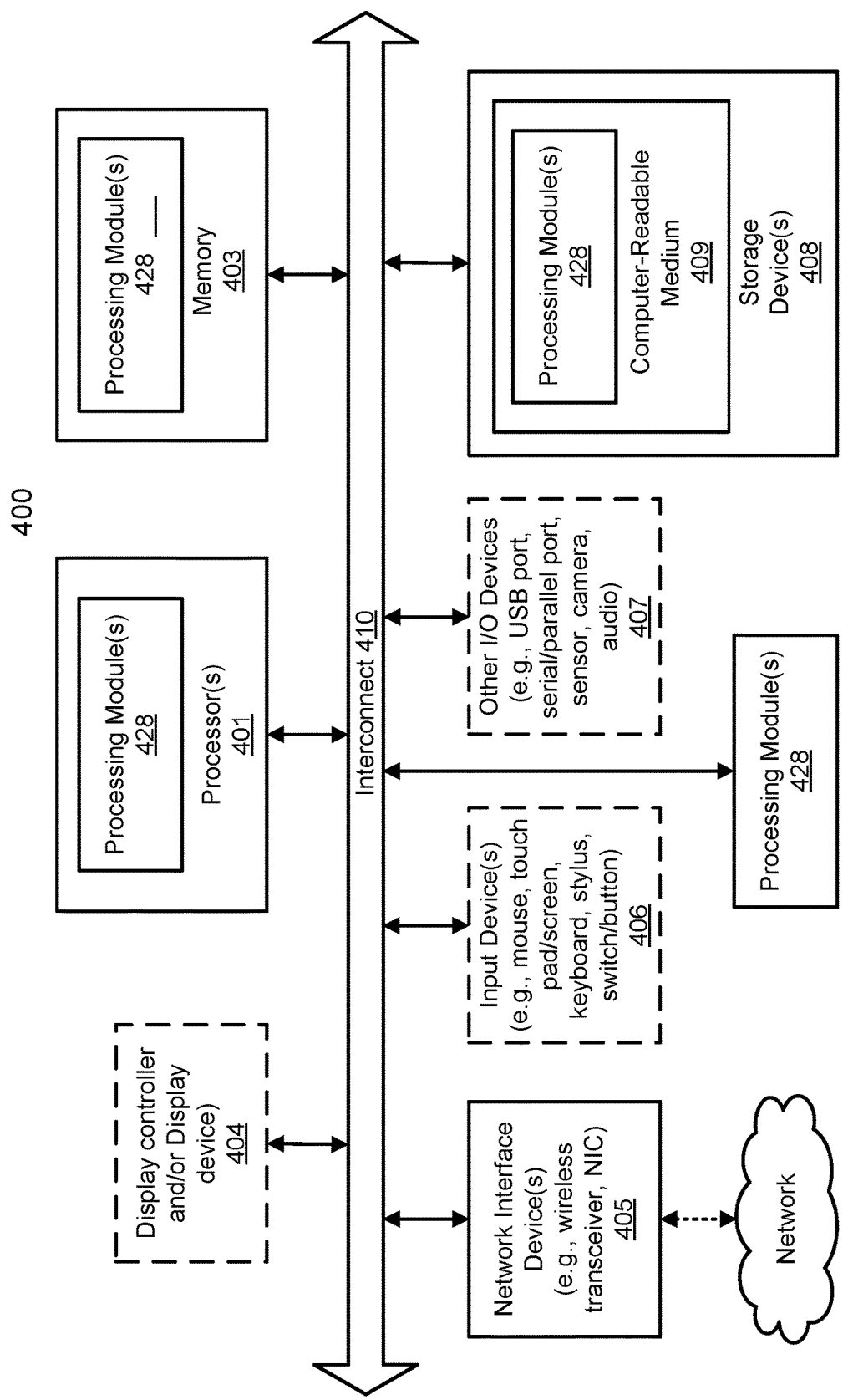
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for authenticating a user device to an application device, the method comprising:
    requesting, by in-band hardware resources of the user device, access to a first computer-implemented service provided by the application device;
    providing, by the in-band hardware resources, credentials usable by the application device to ascertain whether to initiate a second factor authentication using an out-of-band server; and
    in a first instance of the providing where the application device initiates the second factor authentication:
        obtaining, by a management controller of the user device and via an out-of-band communication channel of the user device, a challenge for access to the first computer-implemented service from the out-of-band server,
        providing, by the management controller and via the out-of-band communication channel, a first response to the challenge to the out-of-band server,
        obtaining, by the in-band hardware resources, a second response from the application device, the second response indicating whether the user device should be granted the access to the first computer-implemented service, and
        providing, by the in-band hardware resources, a second computer-implemented service based on the second response.

2. The method of claim 1, wherein an identity of the user device is provided along with the credentials to facilitate identification of the management controller by the out-of-band server.

3. The method of claim 1, in a second instance of the providing where the application device does not initiate the second factor authentication:
    obtaining, by the in-band hardware resources, a third response from the application device, the third response indicating that the access to the first computer-implemented service is denied.

4. The method of claim 1, wherein providing the first response comprises:
    invoking, by the management controller, a function of the in-band hardware resources to obtain user input from a user of the user device, the user input indicating whether the user initiated the requesting the access to the first computer-implemented service; and
    generating the first response based on the user input.

5. The method of claim 1, wherein providing the first response comprises:
    identifying, by the management controller, activity of the in-band hardware resources, the activity indicating whether the in-band hardware resources are performing the requesting of the access to the first computer-implemented service; and
    generating the first response based on the activity.

6. The method of claim 1, further comprising:
    making a first determination, by the application device, regarding whether a user of the user device is authentic using the credentials; and
    in a first instance of the first determination where the user is authentic:
        initiating, by the application device, the second factor authentication of the user device using the out-of-band server.

7. The method of claim 6, further comprising:
    based on the initiating of the second factor authentication:
        identifying, by the out-of-band server, the management controller of the user device,
        providing, by the out-of-band server, the challenge to the management controller;
        obtaining, by the out-of-band server, the first response from the management controller,
        making, by the out-of-band server, a second determination regarding whether the user device is participating in an authentication to the application device using the first response, and
        in a first instance of the second determination where the user device is authentic:
            notifying, by the out-of-band server, the application device that the user device is authentic.

8. The method of claim 1, wherein the user device comprises a network module adapted to separately advertise network endpoints for the management controller and the in-band hardware resources, the network endpoints being usable by the out-of-band server to address communications to the management controller.

9. The method of claim 8, wherein the out-of-band communication channel runs through the network module, and an in-band communication channel that services the in-band hardware resources also runs through the network module.

10. The method of claim 8, wherein the management controller hosts a transmission control protocol/internet protocol (TCP/IP) stack to facilitate network communications via the out-of-band communication channel.

11. A non-transitory machine-readable medium having instructions stored therein, which when executed by a processor, cause the processor to perform operations for authenticating a user device to an application device, the operations comprising:
    requesting, by in-band hardware resources of the user device, access to a first computer-implemented service provided by the application device;
    providing, by the in-band hardware resources, credentials usable by the application device to ascertain whether to initiate a second factor authentication using an out-of-band server; and
    in a first instance of the providing where the application device initiates the second factor authentication:
        obtaining, by a management controller of the user device and via an out-of-band communication channel of the user device, a challenge for access to the first computer-implemented service from the out-of-band server, providing, by the management controller and via the out-of-band communication channel, a first response to the challenge to the out-of-band server, obtaining, by the in-band hardware resources, a second response from the application device, the second response indicating whether the user device should be granted the access to the first computer-implemented service, and providing, by the in-band hardware resources, a second computer-implemented service based on the second response.

12. The non-transitory machine-readable medium of claim 11, wherein an identity of the user device is provided along with the credentials to facilitate identification of the management controller by the out-of-band server.

13. The non-transitory machine-readable medium of claim 11, in a second instance of the providing where the application device does not initiate the second factor authentication:

obtaining, by the in-band hardware resources, a third response from the application device, the third response indicating that the access to the first computer-implemented service is denied.

14. The non-transitory machine-readable medium of claim 11, wherein providing the first response comprises:

invoking, by the management controller, a function of the in-band hardware resources to obtain user input from a user of the user device, the user input indicating whether the user initiated the requesting the access to the first computer-implemented service; and generating the first response based on the user input.

15. The non-transitory machine-readable medium of claim 11, wherein providing the first response comprises:

identifying, by the management controller, activity of the in-band hardware resources, the activity indicating whether the in-band hardware resources are performing the requesting of the access to the first computer-implemented service; and generating the first response based on the activity.

16. A data processing system, comprising:

a processor; and a memory coupled to the processor to store instructions, which when executed by the processor, cause the processor to perform operations for authenticating a user device to an application device, the operations comprising:

requesting, by in-band hardware resources of the user device, access to a first computer-implemented service provided by the application device, providing, by the in-band hardware resources, credentials usable by the application device to ascertain whether to initiate a second factor authentication using an out-of-band server, and in a first instance of the providing where the application device initiates the second factor authentication:

obtaining, by a management controller of the user device and via an out-of-band communication channel of the user device, a challenge for access to the first computer-implemented service from the out-of-band server:

providing, by the management controller and via the out-of-band communication channel, a first response to the challenge to the out-of-band server:

obtaining, by the in-band hardware resources, a second response from the application device, the second response indicating whether the user device should be granted the access to the first computer-implemented service; and providing, by the in-band hardware resources, a second computer-implemented service based on the second response.

17. The data processing system of claim 16, wherein an identity of the user device is provided along with the credentials to facilitate identification of the management controller by the out-of-band server.

18. The data processing system of claim 16, in a second instance of the providing where the application device does not initiate the second factor authentication:

obtaining, by the in-band hardware resources, a third response from the application device, the third response indicating that the access to the first computer-implemented service is denied.

19. The data processing system of claim 16, wherein providing the first response comprises:

invoking, by the management controller, a function of the in-band hardware resources to obtain user input from a user of the user device, the user input indicating whether the user initiated the requesting the access to the first computer-implemented service; and generating the first response based on the user input.

20. The data processing system of claim 16, wherein providing the first response comprises:

identifying, by the management controller, activity of the in-band hardware resources, the activity indicating whether the in-band hardware resources are performing the requesting of the access to the first computer-implemented service; and generating the first response based on the activity.

* * * * *